(12) United States Patent
Karas

(10) Patent No.: US 11,780,330 B1
(45) Date of Patent: Oct. 10, 2023

(54) TRUCK LOAD ALARM SAFETY SYSTEM WITH DRIVE INTERLOCK

(71) Applicant: Arthur Karas, Cleveland, OH (US)

(72) Inventor: Arthur Karas, Cleveland, OH (US)

( * ) Notice: Subject to any disclaimer, the term of this patent is extended or adjusted under 35 U.S.C. 154(b) by 11 days.

(21) Appl. No.: 17/528,076

(22) Filed: Nov. 16, 2021

Related U.S. Application Data

(63) Continuation-in-part of application No. 16/178,429, filed on Nov. 1, 2018, now abandoned, which is a continuation of application No. 15/194,101, filed on Jun. 27, 2016, now abandoned.

(60) Provisional application No. 62/184,274, filed on Jun. 25, 2015.

(51) Int. Cl.
   *B60K 28/08* (2006.01)
   *B60T 17/18* (2006.01)
   *E01H 1/08* (2006.01)

(52) U.S. Cl.
   CPC .............. *B60K 28/08* (2013.01); *B60T 17/18* (2013.01); *B60T 2270/89* (2013.01); *B60Y 2302/03* (2013.01); *B60Y 2302/07* (2013.01); *E01H 1/0836* (2013.01)

(58) Field of Classification Search
   CPC ..... B60K 28/08; B60T 17/18; B60T 2270/89; B60Y 2302/07; B60Y 2302/03; E01H 1/0836

USPC .......................................................... 180/271
See application file for complete search history.

(56) References Cited

U.S. PATENT DOCUMENTS

| 8,132,639 | B2* | 3/2012 | Zuck ...................... | B60K 28/10 141/346 |
| 8,210,306 | B2* | 7/2012 | Zuck ...................... | B60K 28/10 141/346 |
| 2010/0252349 | A1* | 10/2010 | Zuck ...................... | B60K 28/10 180/271 |

FOREIGN PATENT DOCUMENTS

| CA | 2782443 A1 * | 1/2014 | ................ B60P 1/60 |
| KR | 2077966 B1 * | 2/2020 | .............. B60T 13/10 |

* cited by examiner

*Primary Examiner* — Karen Beck
(74) *Attorney, Agent, or Firm* — Gugliotta & Gugliotta LPA

(57) ABSTRACT

A system and method for disabling the travel of a vacuum truck is provided in which a vacuum boom initiates an interlock signal when positioned back into a travel cradle. An additional positional tank bed further includes an interlock signal when the bed is in a secured in a travel position. The vacuum truck is prevented from having its brakes released or prevented from being put into a travel gear if either the truck bed or vacuum boom are not in secure travel positions. The present system and method utilize pneumatic operating signals available from the vehicles power take off and blower mode switch.

14 Claims, 5 Drawing Sheets

TRUCK LOAD ALARM SAFETY SYSTEM WITH DRIVE INTERLOCK

RELATED APPLICATIONS

The present application is a Continuation in Part of U.S. Ser. No. 16/178,429, filed Nov. 1, 2018 which is a Continuation in Part of U.S. Ser. No. 15/194,101, filed on Jun. 27, 2016 and claims the benefit of U.S. Provisional Patent 62/184,274, filed on Jun. 25, 2015 and incorporated by reference as if fully rewritten herein.

BACKGROUND OF THE INVENTION

1. Field of the Invention

The present invention relates to a system and method for limiting unsafe operation of vehicle mounted equipment and, more particularly, to the alarming and disabling of the vehicle drivability in the event of an unsafe load.

2. DESCRIPTION OF THE RELATED ART

Vacuum trucks for the collection and transport of solid waste materials are known. Such trucks are tank trucks with a heavy duty vacuum designed to pneumatically load solids, liquids, sludge or slurry through suction lines typically 2-4" in diameter with 3" being the norm. Such trucks are typically provided with a material collection or waste storage tank which is mounted on a truck frame or chassis. A vacuum source is provided to draw air into the storage tank from a suction or vacuum inlet placed in proximity to the material to be collected. The typical pump used in the industry is the rotary vane vacuum pump. The truck can be configured to be a direct belt drive, or a hydraulic drive system. Two different basic ways to mount the pump either directly on the truck with the vacuum drive powered by the truck motor, or on the trailer with an independent motor. Each application has different handling characteristics. Following collection, the truck is thereafter used to move the collected material to either a disposal or waste recycling site, where the collected material is discharged.

It is an inherent characteristic of some such equipment that in order to operate or empty, the boom and/or bed are movable about a secured position on the chassis. In such situations, a hazardous situation may occur in the event that a driver attempts to move the equipment prior to the boom or bed being secured back to their locked positions.

Such a problem has been long felt within the industry. In spite of this long felt need, those normally involved in the commercial art have had no adequate commercial solution found that can be incorporated onto existing equipment or installed directly while manufacturing such equipment.

SUMMARY OF THE INVENTION

It is thus an object of the present invention to provide a method of providing an operator alarm in the event that a vehicle load is not secure.

It is a further object of the present invention to provide an operational interlock that will prevent the movement of such a vehicle in the event that its load is not secure.

According to one aspect of the present invention, an industrial vehicle having a truck pulling a chassis is provided with a positionable load affixed to the chassis such that the load travel position and a non-travel position may each be detected. According to another aspect of the present invention the non-travel position may be disposed in a different plane than the travel position. A sensor for sensing the differential position of the load initiates an operational signal that create an operational interlock allowing or preventing vehicle travel, respectively.

According to one aspect of the present invention, such a safety system is adapted for and installed onto an existing industrial vehicle in a retrofit manner. According to another aspect of the present invention, such a safety system is installed on and incorporated directly into an industrial vehicle while manufacturing such industrial vehicle.

The operational interlock anticipated by the present invention may be broadly included within a wide range of equivalents. According to one aspect of the present invention, this may be accomplished by preventing release of non-travel parking brakes of the vehicle, or engagement of the non-travel parking brakes. According to another aspect of the present invention, this may be alternately accomplished by preventing engaging of said vehicle from shifting into a travel gear. Such travel gear interference may be done electronically, mechanically or pneumatically, and may be done by interaction with the transfer case, transmission, or other aspect of the drive train, as well as through the programming, reprogramming or signal reinterpretation at the control computer or electronic control unit.

It is a further feature of the present invention that the detection of the load position may be accomplished through a broad range of equivalent mechanisms. The may include the use of a contact type position switch, a non-contact type position switch, an momentum switch (for detection of movement of the load), or an angular position sensor (for detection of position of a lift or load).

Further objects, features, aspects and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. While the present enablement is described and depicted for use with the operation of a vacuum truck, as should be apparent by a person having ordinary skill in the present or related arts the principles of operation of the present invention may be readily adapted or transferred for use with other types of mobile industrial equipment, especially those that are road worthy. Such variations could easily include dump trucks, ladder trucks, cranes and similar or equivalent road driveable equipment that incorporates a movable or articulated load or bed. As such, it is to be understood that the phraseology and terminology employed herein is for the purpose of description and not of limitation and that the present invention should be considered broadly to any such range of equivalents.

Figure 1:
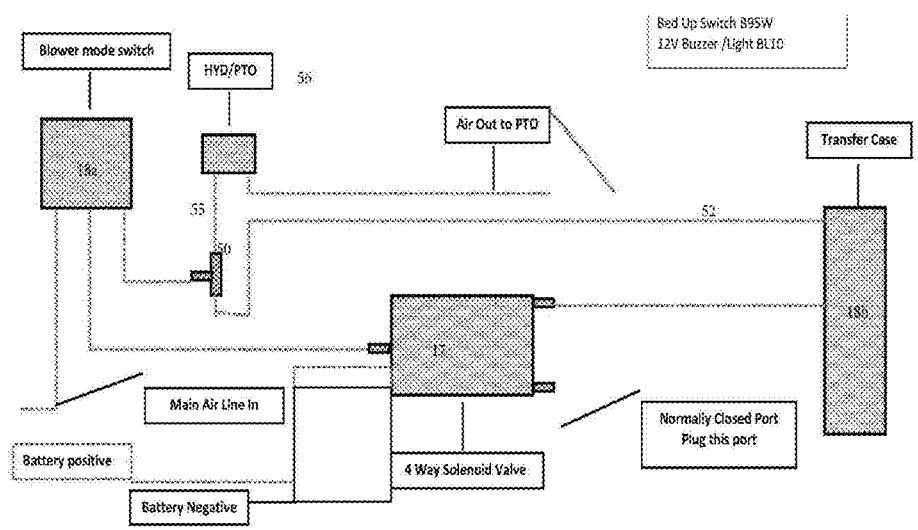
FIG. 1 is a side elevational view of a vacuum truck having a load alarm safety system embodying a preferred embodiment of the present invention.

Referring now to the drawings, wherein like reference numerals indicate the same parts throughout the several views, an industrial vacuum truck is shown, generally noted as 10. As shown in conjunction with FIG. 1, the truck 10 includes a rolling chassis 12 for transporting a storage tank 14. The storage tank has a ingress hose in the form of a boom 16. A vacuum in created in fluid communication with the boom 16 through the tank 14 by way of vacuum blower mechanism 18.

The boom 16 is pivotal and movable such that the boom is position in a different plane when the truck is in use or when the truck is traveling. With the boom 16 nested horizontally in order to facilitate storage during movement of the truck, a hydraulic lift 20 is operatively connected such as to allow directional movement of the boom inlet 16a away from its nested horizontal position during operation so as to allow the boom 16 to be directed toward a variety of targets for cleaning. During transport of the truck 10, the boom 16 is then returned to a storage cradle 22 in its original horizontal position. A first position switch 40 provide operational sensing that the boom 16 is in its storage position within the cradle 22. Further, a mechanical attachment mechanism, such as a chain or lock 42, may secure the boom inlet 16a to a secure position on the truck.

The tank 14 is further pivotally affixed to the chassis 12. Pivoting of the tank 14 allows for discharge and emptying of the contents. A second position switch 46 provides operational sensing that the tank 14 is in its storage position within the chassis 12.

Within a cabin 24 of the truck 10 is an operational control panel 26. The control panel 26 provides operational controls 28 of the vacuum blower mechanism 18.

A first audible and/or visual alarm 44 may indicate operation of the boom 16 and further be provided within sensing range of the driver and/or operator. Similarly, a second such audible and/or visual alarm 48 may indicate position of the bed 14 and further be provided within sensing range of the driver and/or operator.

2. Operation of the Preferred Embodiment

Figure 2:
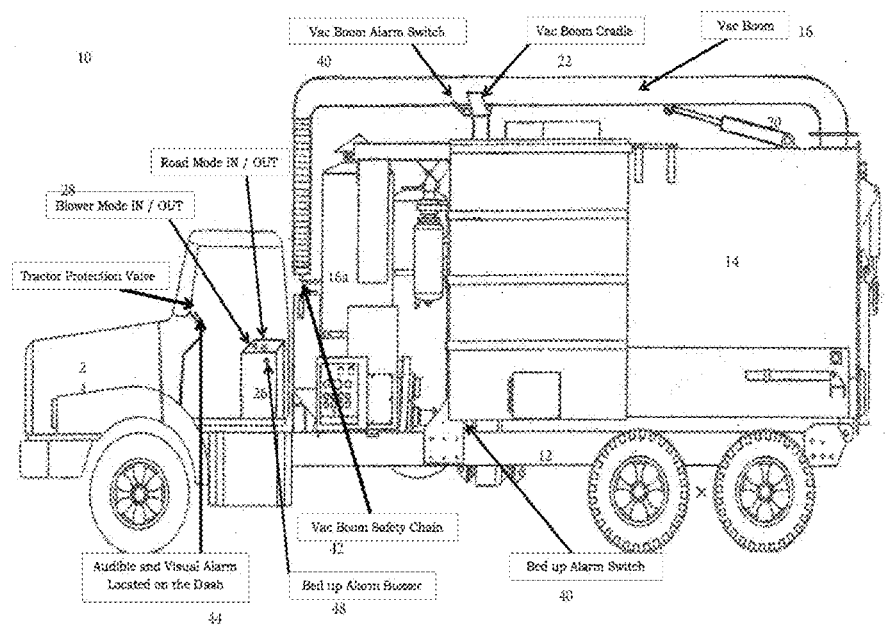
FIG. 2 is a block diagram of the operation thereof.
Figure 3:
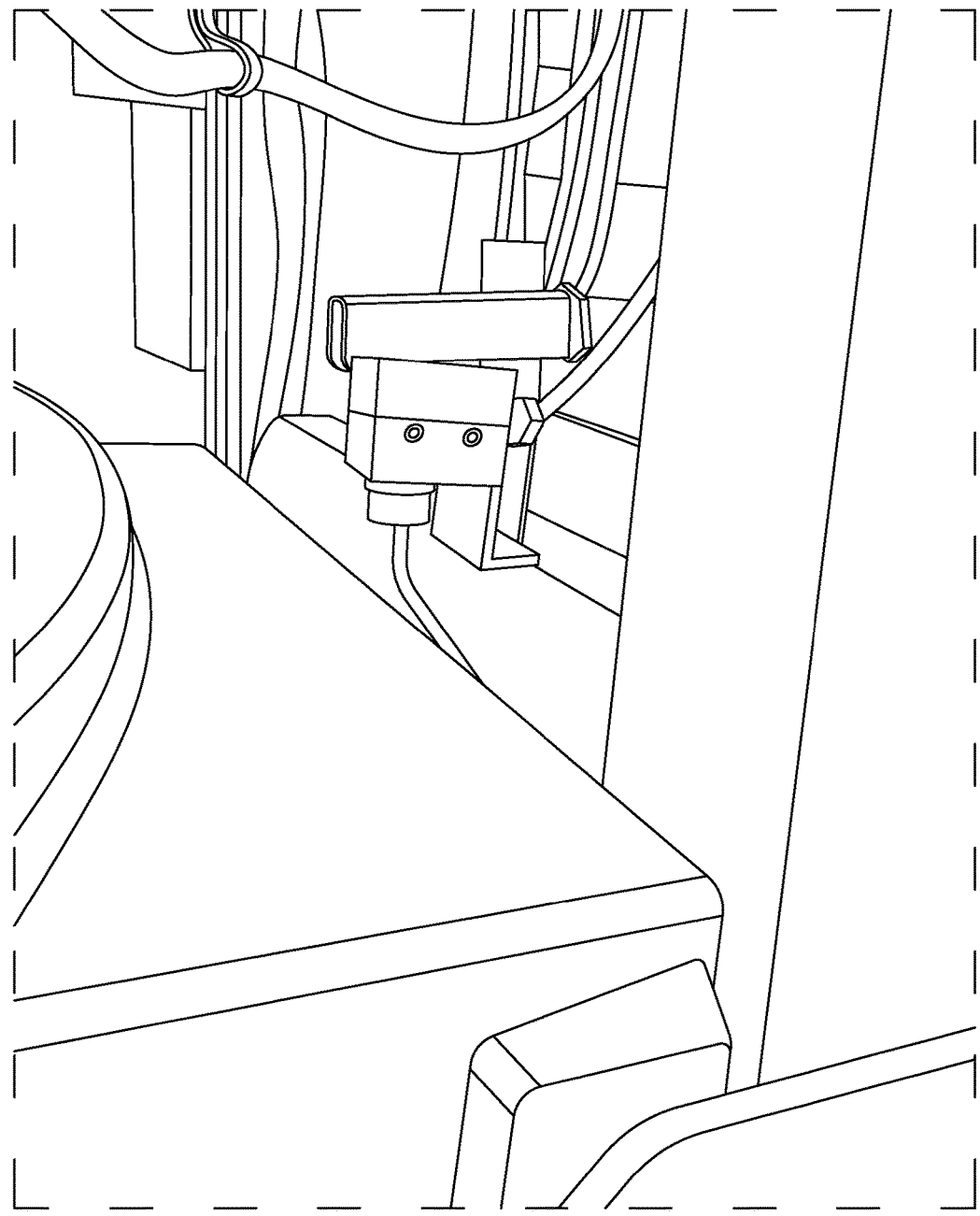
FIG. 3 is a photograph of an otherwise conventional vacuum truck retrofitted with a truck load alarm safety system with drive interlock prototype enabling a preferred embodiment of the present invention having a load bed position switch shown engaged confirming a load safe position.
Figure 4:
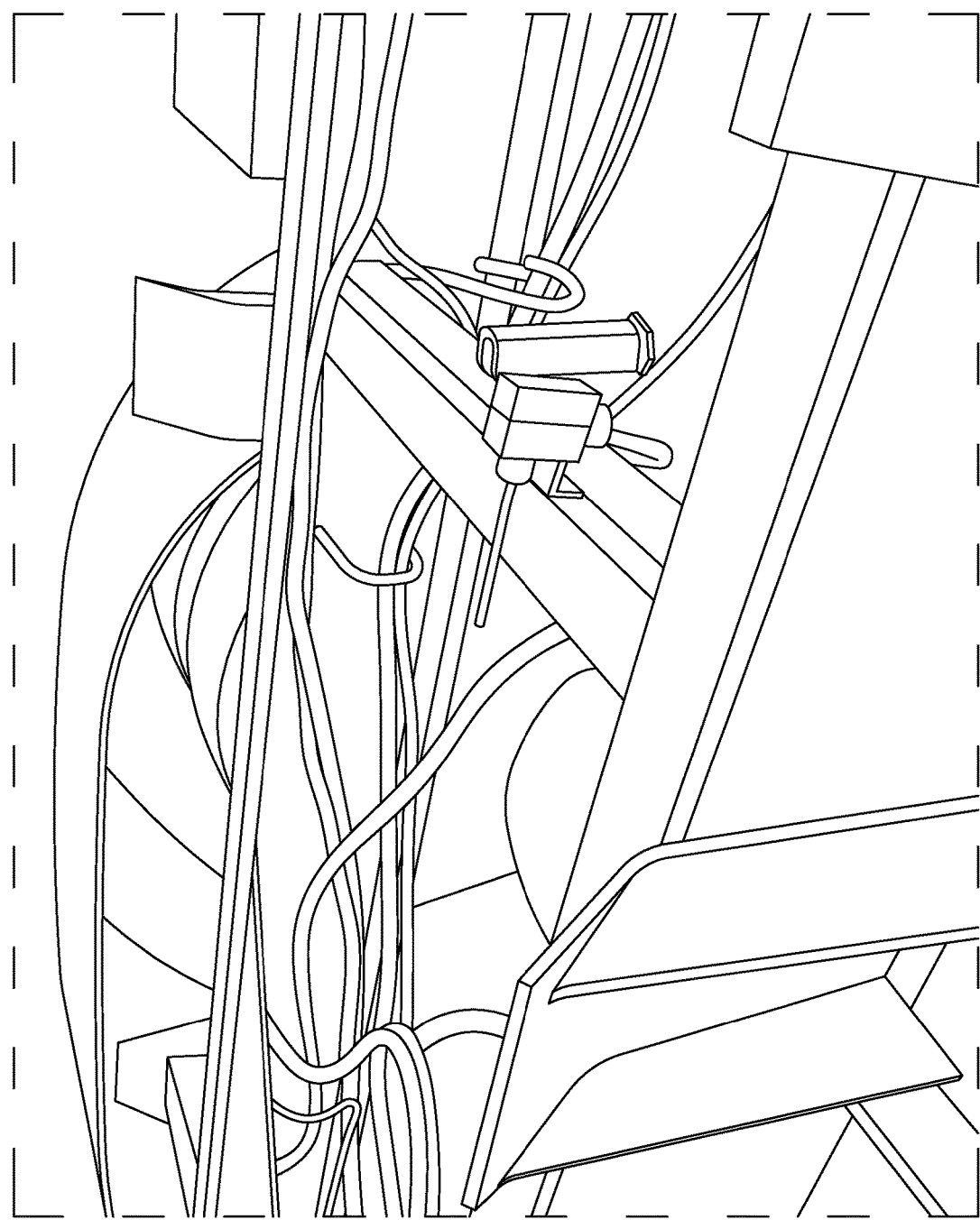
FIG. 4 is a photograph thereof shown having a load bed position switch shown in an operational condition confirming an unsafe load position.
Figure 5:
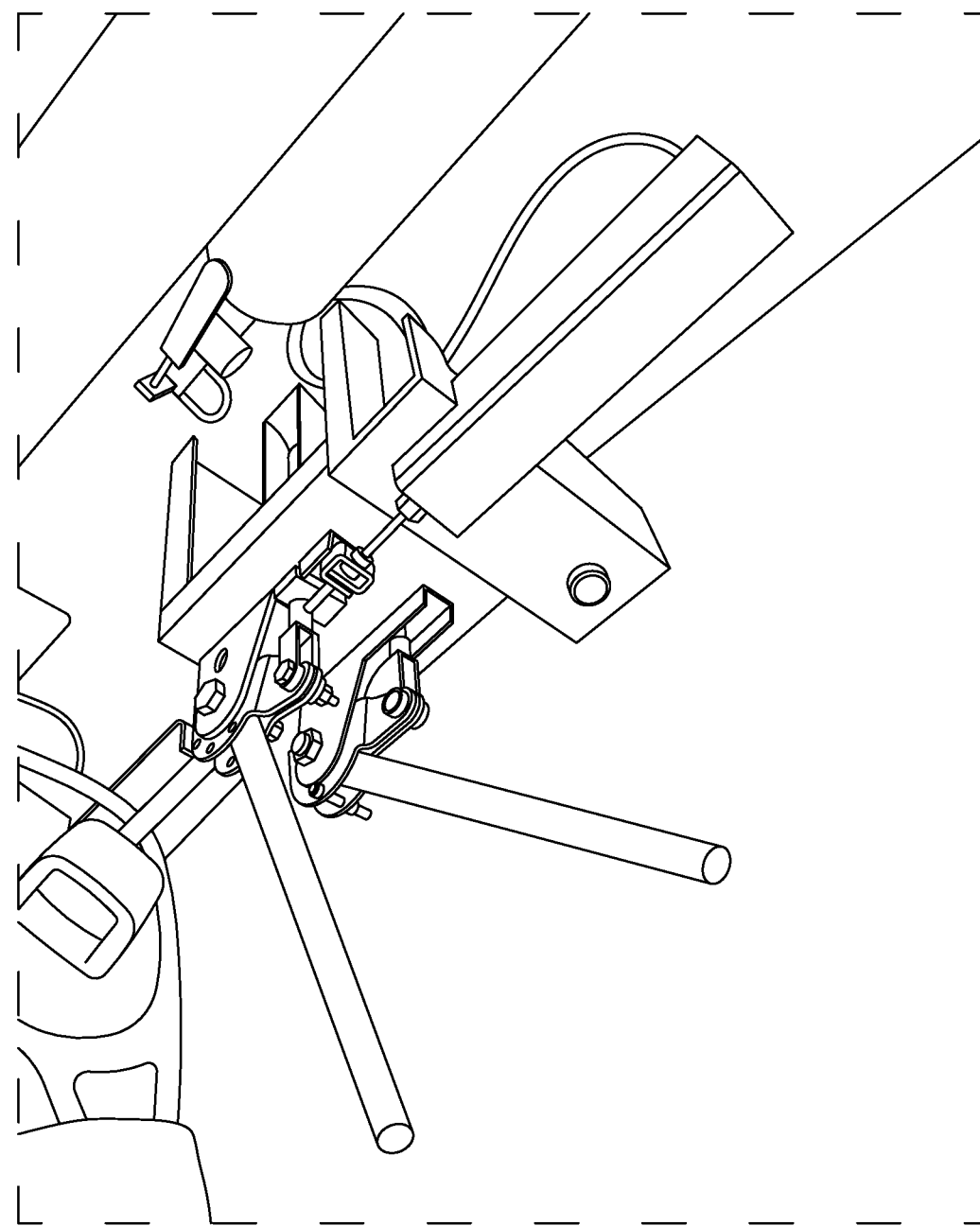
FIG. 5 is a photograph thereof showing a transfer case interlock for use therewith.

Operation of a truck load alarm safety system according to the present invention may be best described in conjunction with FIG. 2. As shown herein, a 4-way, 2 position pneumatic solenoid valve is operationally connected in fluid communication between the blower 18a and transfer case 18b. A flow splitter 50 in fluid communication with the blower side of the road mode switch 18a provides a pneumatic supply 52 to the transfer case 18b as well as a pneumatic supply 55 to the hydraulic power take off switch 56. The position a non-travel position of the load may each be detected. According to another aspect of the present invention the non-travel position may be disposed in a different plane than the travel position. A sensor for sensing the differential position of the load initiates an operational signal that create an operational interlock allowing or preventing vehicle travel, respectively, by engaging the non-travel parking brakes or by preventing disengagement of such parking brake.

While the features and operations of as described above are shown and disclosed in conjunction with their use with a vacuum truck, it should be considered broadly within the scope of the present invention and its range of equivalents that such teachings, innovations and improvements may be utilized in conjunction with industrial vehicles of other type that support chassis mounted equipment that need to be secured prior to travel.

Such an improvement provides an operational signal capable for actuating an alarm, as well as providing an operational interlock signal. It is intended that the operational interlock signal is used to prevent the vehicle from engaging in motions. This may be done either by preventing the release of the vehicle's non-travel parking brakes, or by preventing the vehicle's parking brakes from being released from park or otherwise engaged into a drive gear. The second, preventing the engagement into a drive gear, may be accomplished through operational disengagement of the transfer case, transmission, or other system within the drive train of the vehicle. According to one aspect as used with installations for currently existing vehicles, the overriding of the transfer case or transmission may be implemented in the most direct manner. However, as should be apparent by those having ordinary skill in the relevant art, in light of the present teachings, implementation through the electronic controls or computer enabled drive mechanisms may equivalently be implemented.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar case-law or subsequent precedent should not be made if any future claims are added or amended as a part of or subsequent to this Patent Application.

What is claimed is:

1. In an industrial vehicle having a truck pulling a chassis and a positionable load affixed to the chassis such that the load provides a variable position working element having at least a travel position and a non-travel position, the non-travel position being disposed in a different plane than the travel position, wherein the improvement comprises a safety system consisting essentially of:

said industrial vehicle comprising a vacuum truck adapted for the collection and transport of liquid or solid waste materials;

a position sensor for sensing a position of said load with the plane of the travel position and initiating an operational signal when said load is secured in the travel position; and an operational interlock preventing any travel or initial travel of said truck, said operational interlock being disengaged upon receipt of said operational signal.

2. The improvement of claim 1, wherein said safety system is adapted for and installed onto the industrial vehicle in a retrofit manner.

3. The improvement of claim 1, wherein said safety system is installed on and incorporated directly into the industrial vehicle while manufacturing such industrial vehicle.

4. In the industrial vehicle of claim 1, wherein said operational interlock is selected from the group comprising: preventing release of non-parking travel brakes of said vehicle; preventing engaging of said vehicle from shifting into a travel gear; interference with engagement of a vehicle's power transfer case; and creating locomotion prevention through programming of or interference with a vehicle's computer or ECU.

5. In the industrial vehicle of claim 2, wherein said operational interlock is selected from the group comprising: preventing release of brakes of said vehicle; preventing engaging of said vehicle from shifting into a travel gear; interference with engagement of a vehicle's power transfer case; and creating locomotion prevention through programming of or interference with a vehicle's computer or ECU.

6. In the industrial vehicle of claim 3, wherein said operational interlock is selected from the group comprising: preventing release of brakes of said vehicle; preventing engaging of said vehicle from shifting into a travel gear; interference with engagement of a vehicle's power transfer case; and creating locomotion prevention through programming of or interference with a vehicle's computer or ECU.

7. In the industrial vehicle of claim 1, wherein said position sensor is selected from the group comprising: a contact type position switch; a non-contact type position switch; an momentum switch; an angular position sensor.

8. In the industrial vehicle of claim 2, wherein said position sensor is selected from the group comprising: a contact type position switch; a non-contact type position switch; an momentum switch; an angular position sensor.

9. In the industrial vehicle of claim 3, wherein said position sensor is selected from the group comprising: a contact type position switch; a non-contact type position switch; an momentum switch; an angular position sensor.

10. In the industrial vehicle of claim 4, wherein said position sensor is selected from the group comprising: a contact type position switch; a non-contact type position switch; an momentum switch; an angular position sensor.

11. In the industrial vehicle of claim 5, wherein said position sensor is selected from the group comprising: a contact type position switch; a non-contact type position switch; an momentum switch; an angular position sensor.

12. An industrial vehicle comprising:

a vacuum truck adapted for the collection and transport of liquid or solid waste materials having a chassis and a vertically positionable load affixed to the chassis such that the load has at least a travel position and a non-travel position, the non-travel position being disposed in a different plane than the travel position;

a position sensor for sensing a position of said load with the plane of the travel position and initiating an operational signal when said load is secured in the travel position, wherein said position sensor is selected from the group comprising: a contact type position switch; a non-contact type position switch; an momentum switch; an angular position sensor; and an operational interlock preventing travel or initial travel of said truck, said operational interlock being disengaged upon receipt of said operational signal, wherein said operational interlock is selected from the group comprising: preventing release of non-parking travel brakes of said vehicle; preventing engaging of said vehicle from shifting into a travel gear; interference with engagement of a vehicle's power transfer case; and creating locomotion prevention through programming of or interference with a vehicle's computer or ECU.

13. The industrial vehicle of claim 12, wherein said the non-travel position is angularly disposed to said travel position.

14. The industrial vehicle of claim 12, wherein said the non-travel position is angularly horizontally disposed to said travel position.

\* \* \* \* \*